United States Patent [19]

McCoy et al.

[11] 4,426,302
[45] Jan. 17, 1984

[54] OIL RECOVERY METHOD UTILIZING A DICYCLOPENTADIENE DERIVED ETHOXYSULFONATE

[75] Inventors: David R. McCoy; Robert M. Gipson; Carter G. Naylor, all of Austin, Tex.

[73] Assignee: Texaco Inc., White Plains, N.Y.

[21] Appl. No.: 423,415

[22] Filed: Sep. 24, 1982

[51] Int. Cl.$^3$ .................. C09K 3/00; E21B 3/00; C07C 149/44; C07C 149/00
[52] U.S. Cl. ................ 252/8.55 D; 260/503; 166/275
[58] Field of Search ......... 166/275, 274, 273; 252/8.55 D, 353; 260/503; 149/109.4, 109.6; 585/22

[56] References Cited

U.S. PATENT DOCUMENTS

| | | | |
|---|---|---|---|
| 3,345,419 | 10/1967 | Tinsley | 260/617 |
| 3,827,497 | 8/1974 | Dycus | 252/8.55 D X |
| 4,140,724 | 2/1979 | Nyi | 568/665 |
| 4,169,864 | 10/1979 | Lyons et al. | 149/109.6 X |
| 4,207,080 | 1/1980 | Suld et al. | 149/109.4 X |
| 4,225,736 | 10/1980 | Myers, Jr. | 149/109.4 X |
| 4,229,612 | 10/1980 | Hall, Jr. et al. | 149/109.4 X |
| 4,269,271 | 5/1981 | Shupe | 166/274 |
| 4,324,934 | 4/1982 | Eimers et al. | 585/360 X |
| 4,351,977 | 9/1982 | Fehr | 585/360 X |
| 4,367,351 | 1/1983 | Fisher et al. | 149/109.6 X |
| 4,391,719 | 7/1983 | Meister | 166/273 X |

*Primary Examiner*—Herbert B. Guynn
*Assistant Examiner*—Catherine S. Kilby
*Attorney, Agent, or Firm*—Robert A. Kulason; Jack H. Park; Richard A. Morgan

[57] ABSTRACT

A dicyclopentadiene derived ethoxysulfonate alone or combined with a petroleum sulfonate surfactant is dissolved in water to form an effective surfactant fluid that is stable in high salinity and/or high temperature environments. The surfactant fluid is injected into an underground petroleum-containing reservoir in an enhanced oil recovery process.

10 Claims, No Drawings

OIL RECOVERY METHOD UTILIZING A DICYCLOPENTADIENE DERIVED ETHOXYSULFONATE

BACKGROUND OF THE INVENTION

1. Field of the Invention

This invention relates to a process for recovering petroleum from subterranean formations by aqueous surfactant flooding using a dicyclopentadiene derived ethoxysulfonate containing fluid. In another embodiment, the invention relates to a petroleum recovery fluid comprising petroleum sulfonates and a solubilizing amount of a dicyclopentadiene derived ethoxysulfonate in aqueous medium.

2. Description of the Prior Art

Crude oil which has accumulated in subterranean is recovered or produced through one or more wells drilled into the reservoir. In the initial production, the crude oil is produced by primary recovery techniques wherein only the natural forces present in the reservoir are utilized to produce the oil. However, upon depletion of these natural forces and the termination of primary recovery a large portion of the crude oil remains trapped within the reservoir. Additionally, many reservoirs lack sufficient natural forces to be produced by primary methods from the very beginning. Recognition of these facts has led to the development and use of many enhanced oil recovery techniques. Most of these techniques involve injection of at least one fluid into the reservoir to produce an additional amount of crude oil. Some of the more common methods are water flooding, steam flooding, $CO_2$ flooding, polymer flooding, surfactant flooding, caustic flooding, and in situ combustion.

Water flooding, which involves injection of water into the subterranean oil reservoir for the purpose of displacing the crude oil from the pore spaces of the reservoir rock toward the producing wells, is the most economical and widely used of the enhanced oil recovery methods. Nevertheless, water does not displace oil with high efficiency because of the immiscibility of water and oil and because of the high interfacial tension between them.

Surfactant flooding involves the addition of one or more surface active agents or surfactants to the water flood for the purpose of minimizing the water flooding problems mentioned above. This has been an area of active interest in the art of enhanced oil recovery methods for many years. U. S. Pat. No. 3,302,713 discloses the use of petroleum sulfonates as effective surfactants in oil recovery operations. Other surfactants proposed for use in oil recovery processes include alkyl sulfates, alkyl aryl sulfates, alkyl or alkyl aryl ethoxy sulfates, alkyl sulfonates, alkyl aryl sulfonates, and quaternary ammonium salts.

While the above surfactants may be effective under ideal conditions, there are problems concerned with the use of each in most petroleum reservoirs. Some of the most serious problems arise from the effects of reservoir fluid salinity on the injected surfactant solution, the most common being precipitation and resultant loss of the surfactant. The petroleum sulfonates represent a class of surfactants that are relatively inexpensive and that are quite effective oil recovery agents under certain conditions. However, when used in single surfactant systems, they are best employed in reservoirs having brines of 10,000 ppm or less total dissolved solids salinity and a very low divalent ion concentration. Effectiveness of a petroleum sulfonate surfactant system can be extended somewhat by blending oil soluble petroleum sulfonates with water soluble petroleum sulfonates. However, even a solution such as this is not entirely satisfactory because as the blended mixture is driven through the formation one of the components is often preferentially retained within the formation matrices, causing a change in the relative concentration of the surfactant components and resulting in a failure to maintain effective salinity tolerance as evidenced by precipitation of the sufactants.

It can readily be seen that there remains a substantial need for a surfactant flooding process that will allow the use of petroleum sulfonates in high salinity and high divalent ion concentration reservoir environments.

U.S. Pat. No. 4,140,724, Nyi et. al., describes reactions involving dicyclopentadiene.

SUMMARY OF THE INVENTION

The dicyclopentadiene derived ethoxysulfonate of the present invention can be generically represented by the formula:

$$R-Y(CH_2CH_2O)_m(CH_2)_nSO_3X$$

wherein

R is the dicyclopentenyl moiety:

Y is a divalent moiety selected from the group consisting of oxygen and sulfur,
X is a cation selected from the group consisting of sodium, potassium and ammonium,
n is an integer of from 2 to 3,
m is an integer of from 1 to 10 with the proviso that when Y is sulfur, m is an integer of from 2 to 10.

These surface active agents may be used as the only constituent in an aqueous solution or they may be used in combination with each other or with an anionic surfactant such as petroleum sulfonate.

DESCRIPTION OF THE PREFERRED EMBODIMENTS

This invention concerns an improved surfactant water flooding petroleum recovery process suitable for use in high salinity formations, e.g., formations containing water or brine whose salinity is from 20,000 to 240,000 parts per million total dissolved solids, which formation brines frequently also contain high concentration of divalent ions such as calcium and magnesium in the range from 1,000 to 20,000 parts per million. The surfactant fluid is ordinarily compounded to have about the same salinity as the formation water, usually in the range from 50% to 100% and preferably from 75% to 100% of the salinity of the water present in the formation. In one embodiment, the present invention relates to a process for recovering petroleum from a subterranean petroleum bearing formation penetrated by an injection well and a production well which comprises:

(A) injecting into the formation via the injection well a drive fluid comprising water having dissolved therein an effective amount of a surface active agent having the general formula:

wherein R is a dicyclopentenyl moiety, Y is a divalent moiety selected from the group consisting of oxygen and sulfur, X is a cation selected from the group consisting of sodium, potassium and ammonium, n is an integer of from 2 to 3, m is an integer of from 1 to 10 with the proviso that when Y is sulfur, m is an integer of from 2 to 10;

(B) forcing the fluid through the formation; and
(C) recovering petroleum through the production well.

The integer m is preferably an integer of from 2 to 6.

As previously mentioned, the fluid is typically made up in brine solution and particular compatibility with brine has been found when X is sodium.

The concentration of an effective amount of dicyclopentadiene derived ethoxysulfonate in aqueous solution will vary depending on the particular homologue chosen for use as well as the water salinity and hardness and the temperature to be encountered in the formation. It is preferred that the optimum response at various concentrations be measured under conditions simulating those which will be present in the formation and the concentration which corresponds to the optimum surfactant performance characteristics be identified in this manner. In actual field use, the concentration of surfactant used will be considerably greater than the optimum value determined from the capillary displacement value in order to compensate for surfactant absorbed by the formation. Generally the concentration of dicyclopentadiene derived ethoxysulfonate will be from about 0.05 to about 5.0 percent and preferably from about 0.1 to about 2.0 percent by weight.

The volume of surfactant solution to be utilized in the process of this invention can vary from about 2 to about 75 pore volume percent and is preferably from about 10 to about 50 pore volume percent. It is, of course desirable from an economic standpoint to use as small an amount of surfactant as possible to attain the necessary performance.

Ordinarily, the petroleum formation will have been subjected to conventional water flooding before the application of the surfactant solution of this invention; although this is not a requirement for the application of the surfactant process of this invention. Water flooding is generally undertaken if it will result in the recovery of a reasonable quantity of oil above that required by primary means since it is much less costly than surfactant flooding or other means of enhanced recovery. If the surfactant flooding process is to be applied to a formation which has already been water flooded, the water sample tested should be that existing in the formation after water flooding since the concentration of salt as well as water soluble salts of divalent cations such as calcium or magnesium may be changed as a consequence of injecting water differing from the original formation water. As a corollary to this, the formation temperature after water flooding should be ascertained since it may have been altered as a consequence of the water flooding process. Preflushing with a sacrificial agent, e.g., inorganic phosphate, may be useful to minimize adsorption losses of the surfactant on the formation matrix.

It is also common practice to follow the surfactant solution with an aqueous solution which contains little or no surfactant but which has dissolved in it a substance which increases viscosity of the water so as to attain a favorable mobility ratio between that solution and the previously injected surfactant solution. Hydrophilic polymers such as sodium polyacrylamide or polysaccharides are commonly utilized for this purpose. The type and quantity of viscosity increasing polymer injected subsequent to the surfactant solution can generally be the same as in regularly used for such purposes in conventional surfactant flooding. Generally from about 5 to about 50 pore volume percent of an aqueous solution containing from about 100 to about 800 parts per million of the hydrophilic polymer is used. This is followed by water injection which is continued until the water-oil ratio of the fluid being recovered from the formation increases to a point where further injection of water is uneconomical. It is, of course, also acceptable to increase the viscosity of the surfactant fluid by incorporation of a similar polymer.

Another embodiment of the present invention is an aqueous fluid comprising:

(A) about 0.1 wt % to about 2 wt % of a surface active agent of the formula:

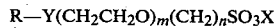

wherein R is a dicyclopentenyl moiety, Y is a divalent moiety selected from the group consisting of oxygen and sulfur, X is a cation selected from the group consisting of sodium, potassium and ammonium, n is an integer of from 2 to 3, m is an integer of from 1 to 10 with the proviso that when Y is sulfur, m is an integer of from 2 to 10.

(B) about 0.1 wt % to about 4 wt % of a petroleum sulfonate.

It is preferred that the petroleum sulfonate be at least partially water soluble with an average equivalent weight at a range of from about 350 to 500. The ratio of the dicyclopentadiene derived ethoxysulfonate to petroleum sulfonate should be from 0.05:1 to 1:1 and preferably from 0.1:1 to 1:1.

The water which makes up the aqueous medium of the fluid mixture of this invention may be either hard or soft. The invention has been found to be particularly useful in hard water such as brine which contains considerable amounts of divalent ions. That is, the invention is especially effective for stabilizing aqueous surfactant solutions in which the aqueous medium contains considerable amounts of calcium and/or magnesium ions and is considered hard water. It is in these hard waters that some surfactants are particularly prone to be unstable. It is known in the art that surfactants such as petroleum sulfonates are not at all compatible with calcium and magnesium ions in hard water. Recent discoveries have shown that the sulfonates of alkylene oxide adducts of substituted phenols are compatible with calcium and magnesium ions in hard water or brine but their stability, that is their ability to remain in solution under all conditions of temperature and water hardness and salinity, is at times a problem.

The present invention while including all types of water is particularly directed to hard water brines. Hard water may be defined as an aqueous solution containing from 100–20,000 parts per million polyvalent metal ions such as calcium and/or magnesium ions. Brines contain a minor amount to 25% by weight sodium chloride and many contain various amounts of other dissolved salts such as sodium bicarbonate, sodium sulfate, and sodium borate. The invention is operable in hard water, brines or hard water brines.

The water may also contain dissolved nitrogen, hydrogen sulfide, carbon dioxide, methane or other gases.

The various materials available under the general name of petroleum sulfonates vary in composition according to the petroleum fraction used for sulfonation and in the degree of sulfonation imparted to the petroleum fraction. Preferable petroleum sulfonates are those prepared from a petroleum fraction whose boiling range is from 700° F. to 1100° F. which corresponds to a molecular weight range of from about 350 to about 500. The sodium salt of the sulfonated product of this petroleum fraction is an excellent material for use in the present invention. The potassium and ammonium salts are also useful.

Mixtures of petroleum sulfonates can also be employed in the fluid of the present invention. For example, a mixture of predominantly water soluble petroleum sulfonate having an average equivalent weight of less than 400 and preferably less than 350 may be utilized along with a second petroleum sulfonate which is at least partially oil soluble and having an average equivalent weight of about 400 to about 600 and preferably about 450 to about 550.

It has been found that the degree of solubility of the surfactant composition in the field water is extremely critical to the oil recovery efficiency in the process. If the surfactant is much more soluble in water than oil, then the surfactant tends to be distributed throughout the bulk of the water phase including both formation water and injected drive water, and little effectiveness will be achieved at the interfacial zones between oil and water. Similarly, if the surfactant is substantially more soluble in oil than it is in water, the surfactant will partition into and distribute itself throughout the oil phase, and will have little effect on the surface tension existing at the interfacial zone between oil and water. The optimum surfactant effectiveness is achieved if there is a condition of borderline solubility of the surfactant fluid in the drive water and/or formation water, so that the surfactants tend to exist in higher concentrations at the interfacial zone between oil and water than in either the oil phase or the water phase.

It has been found that when using blends of petroleum sulfonates and the dicyclopentadiene derived ethoxysulfonate of the present invention, optimum oil recovery efficiency occurs when the concentrations of the materials were carefully balanced so as to produce a condition of borderline solubility. If too little solubilizing cosurfactant is used, the primary surfactants are rendered insoluble and at least a portion thereof will precipitate in the aqueous solution. This can, as discussed above, result in at least reducing the effectiveness of the surfactant fluid for the purpose of recovering oil, and may lead to permanent, irreversible damage to permeability of the formation matrix, which will prevent any further displacement of petroleum from the formation. On the other hand, if more than the minimum amount of solubilizing dicyclopentadiene derived ethoxysulfonate which achieves the conditions which we have described above as borderline solubility is used in combination with petroleum sulfonate, the surfactants are rendered too soluble in the aqueous phase and the amount of oil displaced by such a solution being injected into a formation is reduced fairly substantially. Moreover, since the cost of the dicyclopentadiene derived ethoxysulfonate is high compared to that of petroleum sulfonate, the result of using too much solubilizing dicyclopentadiene derived ethoxysulfonate is that the fluid cost is increased and the amount of oil recovered by the use of the fluid is decreased, with rapidly diminishing economic attractiveness of the process.

The amount of solubilizing dicyclopentadiene derived ethoxysulfonate to achieve the above described desired condition of borderline solubility is highly dependent on all of the possible variations in the structural characteristics of the surfactant molecules employed. The average equivalent weight of the petroleum sulfonate for example, will affect the amount of dicyclopentadiene derived ethoxysulfonate required to achieve the condition of borderline solubility. For example, any change in the number of ethylene oxide groups condensed with the molecule, will change the amount of dicyclopentadiene derived ethoxysulfonate cosurfactant needed to achieve the condition of borderline solubility with whatever primary anionic surfactant or mixture thereof it is used. Furthermore, the aqueous fluid salinity and the concentration of divalent ions present in the fluid will also determine the amount of the surfactants needed to achieve borderline solubility. Generally, higher salinity and/or higher concentrations of divalent ions of the aqueous fluid in which the surfactants are dissolved require increasing number of ethylene oxide units to be present on the solubilizing cosurfactant molecule.

It has been found that one satisfactory method for determining the proper concentrations of petroleum sulfonate and dicyclopentadiene derived ethoxysulfonate is found in U.S. Pat. No. 4,066,124 which is incorporated herein in its entirety by reference. By this method it has been found that brine solutions of about 0.1 wt % to about 2 wt % of the dicyclopentadiene derived ethoxysulfonate of the present invention and about 0.1 wt % to about 4 wt % of a petroleum sulfonate herein defined produce advantageous results in an enhanced oil recovery process. These advantageous results include applications where hydrolytically and thermally stable surface active agents soluble in salt solutions containing divalent cations is required. Advantageous results are also achieved where relatively viscous solutions or emulsions are desired.

One unexpected advantage of the dicyclopentadiene derived ethoxysulfonate of the present invention is the surprising stability and viscosity displayed by some of the compounds over a wide range of salinities and temperatures.

Another surprising advantage of the present invention is that good oil displacement results when the dicyclopentadiene derived ethoxysulfonate of the present invention is used as a solubilizer of petroleum sulfonates in an oil recovery process. A 10-carbon moiety usually is insufficiently hydrophobic to prepare true surfactants. The borderline surfactant character of the dicyclopentadiene derived sulfonates of the present invention is confirmed by antagonistic titration results with cationic surfactants.

In another embodiment, the present invention relates to a composition of matter characterized by the formula:

$$R-Y(CH_2CH_2O)_m(CH_2)_nSO_3X$$

wherein R is a dicyclopentenyl moiety, Y is a divalent moiety selected from the group consisting of oxygen and sulfur, X is a cation selected from the group consisting of sodium, potassium and ammonium, n is an integer of from 2 to 3, m is an integer of from 1 to 10 with the proviso that when Y is sulfur, m is an integer of from 2 to 10.

The integer m is preferably an integer of from 2 to 6. Sodium is a preferred cation.

Compounds of the present invention may be prepared according to the following sequence:

(1) Preparation of Mono Ether
 (Described more fully in U.S. Pat. No. 4,140,724)

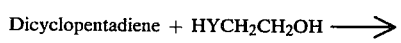

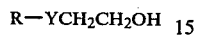

(2) Ethoxylation

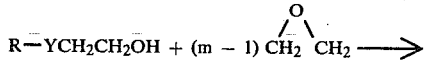

(3) Sulfonation (a) 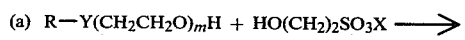

(b) 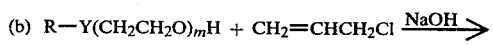

Synthesis of the compounds of the present invention is more fully described in the Examples.

Use In Enhanced Oil Recovery

The surfactant fluid is preferably prepared in formation water or field water having a salinity and divalent ion concentration about equal to the formation water. The quantity of surfactant fluid utilized will generally be from 0.1 to 1.0 pore volume based on the pore volume of formation to be swept by the surfactant fluid. The surfactant fluid should be followed by injection of a mobility buffer, which is an aqueous solution of a hydrophilic, viscosity increasing polymer such as polyacrylamide or polysaccharide. Generally from 50 to 1000 parts per million polymer concentration is sufficient to produce a fluid having a viscosity greater than the formation petroleum viscosity, which is adequate to ensure efficient displacement. From 0.1 to 0.5 pore volumes of the viscous mobility buffer solution are used. This is in turn followed by injection of field water to displace all of the injected fluids and petroleum through the formation to the production well. Field water injection is continued until the oil cut of the produced fluid drops to an uneconomic level.

This invention is more fully illustrated by the following Examples:

EXAMPLE I

A. One mole of ethylene glycol was added to the norbornyl double bond of dicyclopentadiene using a BF$_3$-diethyl ether complex as catalyst. To 474 grams of the adduct obtained were added 3 grams of potassium hydroxide and after stripping of water, 215 grams of ethylene oxide at 100° C. to 130° C. Hydroxyl number analysis of the product confirmed the structure as the mono(dicyclopentenyl) ether of triethyleneglycol.

B. A one liter resin flask was charged with 600 grams of the product of Example I-A and 5.4 grams of potassium hydroxide and the mixture was heated to 180° C. at 120 mm Hg pressure with good mechanical stirring. Then, 300 grams of a 56% aqueous solution of HOCH$_2$CH$_2$SO$_3$Na was introduced dropwise over a 2½ hour period under these conditions while removing water overhead. The mixture was digested at 180° C. and 120 mm Hg for an additional 45 minutes and then cooled to room temperature. Then the crude reaction mixture was taken up in 1000 grams of water and extracted successively with 1700 grams, 1000 grams, 1000 grams and 500 grams of ethyl acetate to remove unreacted nonionics of which 265 grams was recovered.

The aqueous solution was distilled to completely remove dissolved ethyl acetate, leaving 1010 grams of aqueous product solution containing 24.2 wt % of the desired product sulfonate and 53.7 wt % water.

The product was determined to have the formula:

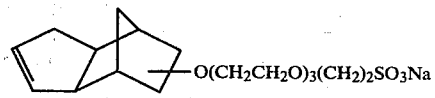

EXAMPLE II

By the method of Example I-A, 2.6 moles of ethylene oxide was added to the reaction product obtained by free radical additon of one mole of beta-hydroxyethylmercaptan to dicyclopentadiene. This product (450 grams) was charged to a one liter resin flask with 4 grams of potassium hydroxide and 245 grams of a 56% aqueous solution of HOCH$_2$CH$_2$SO$_3$Na was added over 2 hours under conditions described in Example I-B. This mixture was digested at 180° C. and 120 mm Hg for 1 hour and then extracted as described in Example I-B. Workup yielded 843 grams of aqeos solution containing 26.2 wt % by titration of the desired sulfonate.

The product was determined to have an average formula of:

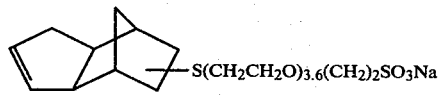

EXAMPLE III

A. A one liter flask was charged with 304 grams of the ethylene glycol adduct of dicyclopentadiene which was prepared using a BF$_3$-diethyl ether complex as mentioned in Example I. The flask was heated to 110° C. with mechanical stirring. To the flask was added a solution of 65 grams NaOH in 110 grams of water over about a half hour with nitrogen purging while maintaining a pressure of about 1 to 10 mm Hg. The mixture was digested for 2 hours under vacuum at 110° C. and then 110 g. of allyl chloride was added over 3 hours at 80° C. to 85° C. Enough excess allyl chloride was removed overhead to raise the reflux temperature to 120° C., followed by vacuum stripping at this temperature. To the remaining reaction mixture were added 250 ml water and 100 grams of isopropanol. The aqueous layer was discarded and the organic layer stripped to remove solvent, leaving 278 grams of partially allylated ether dicyclopentenoxyethanol, identified by nmr spectroscopy.

B. A round bottom flask equipped with mechanical stirrer, air inlet tube with fritted disk, reflux condenser, thermometer, dropping funnel and pH probe was charged with 25 grams of the allyl ether of Example III-A, 150 grams of isopropyl alcohol, 125 grams of water and 8 grams of aqueous 20% sodium hydroxide solution. The mixture was stirred at 55° C. with an air flow of 30 ml/min while metering in an aqueous 33.3% sodium metabisulfite solution at such a rate as to maintain solution pH at 7.2. An additional 100 grams of the allyl ether of Example III-A was slowly added over the first hour of reaction. After 8 hours, 147 grams of bisulfite solution had been added and the pH began dropping.

The reactor was shut down and 50 grams of isopropyl alcohol was added. The bottom layer which contained the bulk of the inorganic salts was removed. The top layer was stripped to remove isopropyl alcohol. The residue was dissolved in 100 grams of water and extracted with 580 grams of ethyl acetate in three portions to recover 42 grams of unreacted nonionics.

The aqueous layer was distilled to remove dissolved ethyl acetate, leaving a 275 gram solution of the desired propane sulfonate, identified as

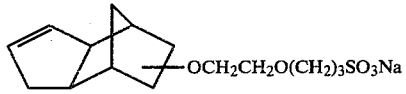

The solution contained a calculated 39 wt % sulfonate based on unreacted starting materials but only gave a value of 16.2% by antagonistic titration with cationic surfactant, indicating the borderline surfactant properties of the compound.

EXAMPLE IV

A. The compound $R-S(CH_2CH_2O)_1(CH_2)_3SO_3Na$ was prepared from the mercaptoethanol adduct of dicyclopentadiene, allyl chloride and sodium bisulfite using the method of Example III. The product solution was found to contain 22.6% desired sulfonate with a titration value of 16 wt %.

B. A solution of $R-S(CH_2CH_2O)_{2.3}(CH_2)_3SO_3Na$ (38 wt % calculated sulfonate, 26.1 wt % by titration) was prepared by the method of Example III on the 1.3 molar ethoxylate of the mercaptoethanol adduct of dicyclopentadiene.

C. A solution of $R-S(CH_2CH_2O)_{2.9}(CH_2)_3SO_3Na$ (44 wt % calculated sulfonate, 30.7 wt % by titration) was prepared using the method of Example III on the 1.9 molar ethoxylate of the mercaptoethanol adduct of dicyclopentadiene.

D. Three moles of propylene oxide were added using standard alkoxylation conditions to dicyclopentenyl alcohol. This product was reacted first with allyl chloride and then with sodium bisulfite using the method of Example III. The resulting product, product of Example IV-D, contained 14.8 wt % desired propane sulfonate by calculation. The titration value was 4.9 wt %. The structure of the resulting compound was determined to be $R-O(CH_2CH(CH_3)O)_3(CH_2)_3SO_3Na$ E. Screening tests were conducted to test the ability of dicyclopentadiene derived ethoxysulfonates to solubilize petroleum sulfonates in brine. Screening tests for all of the solubilizers were performed in the same manner to allow a direct cross-comparison. The surfactant system consisted of three components (TRS-18/TRS-40/solubilizer) in different proportions to form solutions with a total of 2.5% weight active surfactant. TRS-18 is an oil soluble petroleum sulfonate of average equivalent weight 502 and an equivalent weight range of 353 to 640. TRS-40 is a water soluble petroleum sulfonate of average equivalent weight 337 and an equivalent weight range of 273 to 440. Both TRS-18 and TRS-40 are products of Witco Chemical Company.

The solutions contained 85,000 ppm of dissolved salts and this was kept constant by adding a fixed quantity of simulated Slaughter 2 field produced brine. Deionized water was then added in varying amounts to make a total weight of 50 grams for each sample. The mixtures were stirred with heating and then aged overnight. After aging, the solutions were observed for phase stability. Stable solutions were tested for capillary displacement at room temperature with Slaughter stock tank oil thinned to reservoir viscosity by heptane addition (25 volume percent heptane).

Solubilized systems incorporating the products of Examples I, II, III or IV-C showed large areas of phase stability and moderately large areas of capillary displacement activity on ternary diagrams. The products of Example IV-A and IV-D showed no ability to solubilize petroleum sulfonates. The product of Example IV-B showed good performance in capillary tests and continuous surfactant core floods; however, a large volume of surfactant was required.

EXAMPLE V

In a field in which the primary production has already been exhausted, an injection well is completed in the hydrocarbon-bearing formation and perforations are formed between the interval of 6890–6910 feet. A production well is drilled approximately 415 feet distance from the injection well, and perforations are similarly made in the same hydrocarbon-bearing formation at 6895–6915 feet.

The hydrocarbon-bearing formation in both the injection well and the production well is hydraulically fractured using conventional techniques, and a gravel-sand mixture is injected into the fracture to hold it open and prevent healing of the fracture.

In the next step, oil field brine of 1000 ppm hardness at a temperature of 75° F. containing dissolved therein 1% by weight petroleum sulfonate and 0.5% by weight of the product of Example I is injected via the injection well into the formation at a pressure of about 1300 psig and at the rate of 1.05 barrels per minute. Injection of the driving fluid continues at the rate of 1.05 barrels per minute and at the end of 67 days, a substantial production of petroleum is achieved.

The principle of the invention and the best mode contemplated for applying that principle have been described. It is to be understood that the foregoing is illustrative only and that other means and techniques can be employed without departing from the true scope of the invention defined in the following claims.

What is claimed is:

1. A process for recovering petroleum from a subterranean petroleum-bearing formation penetrated by an injection well and a production well which comprises:
   (A) injecting into the formation via the injection well a drive fluid comprising water having dissolved therein about 0.05 to about 5.0 percent by weight of a surface active agent having the general formula:

$$R-Y(CH_2CH_2O)_m(CH_2)_nSO_3X$$

wherein
R is a dicyclopentenyl moiety,
Y is a divalent moiety selected from the group consisting of oxygen and sulfur,
X is a cation selected from the group consisting of sodium, potassium and ammonium,
n is an integer of from 2 to 3,
m is an integer of from 1 to 10 with the proviso that when Y is sulfur, m is an integer of from 2 to 10;
(B) forcing the fluid through the formation and
(C) recovering petroleum through the production well.

2. The process of claim 1 wherein m is an integer of from 2 to 6.

3. The process of claim 1 wherein X is sodium.

4. The process of claim 1 wherein the drive fluid additionally comprises brine.

5. An aqueous fluid comprising:
(A) about 0.1 wt. % to about 2 wt. % of a surface active agent of the formula:

$$R-Y(CH_2CH_2O)_m(CH_2)_nSO_3X$$

wherein
R is a dicyclopentenyl moiety,
Y is a divalent moiety selected from the group consisting of oxygen and sulfur,
X is a cation selected from the group consisting of a sodium, potassium and ammonium,
n is an integer of from 2 to 3,
m is an integer of from 1 to 10 with the proviso that when Y is sulfur, m is an integer of from 2 to 10; and
(B) about 0.5 wt. % to about 10 wt. % of a petroleum sulfonate.

6. The fluid of claim 5 wherein m is an integer of from 2 to 6.

7. The fluid of claim 5 wherein X is sodium.

8. The fluid of claim 5 wherein the petroleum sulfonate has a molecular weight of about 350 to about 500.

9. The fluid of claim 5 wherein the fluid is additionally comprised of brine.

10. The process of claim 1 wherein the amount of surface active agent is from about 0.1 to about 2.0 percent by weight.

* * * * *